United States Patent [19]

Miskin

[11] 3,870,173
[45] Mar. 11, 1975

[54] BALE LOADER
[75] Inventor: Richard B. Miskin, Ucon, Idaho
[73] Assignee: Miskin Scraper Works, Inc., Ucon, Idaho
[22] Filed: Mar. 1, 1974
[21] Appl. No.: 447,067

Related U.S. Application Data
[62] Division of Ser. No. 233,430, March 9, 1972, Pat. No. 3,809,256.

[52] U.S. Cl. .............. 214/152, 198/7 BL, 214/6 B, 214/518
[51] Int. Cl. ........................................... B65g 57/32
[58] Field of Search ......... 214/6 B, 83.22, 508, 509, 214/510, 518, 519, 152; 198/7 BL

[56] References Cited
UNITED STATES PATENTS

| | | | |
|---|---|---|---|
| 2,099,998 | 11/1937 | Berg | 214/518 X |
| 3,083,849 | 4/1963 | Mottin | 214/302 |
| 3,435,972 | 4/1969 | Miskin et al. | 214/6 B X |
| 3,478,898 | 11/1969 | Graham et al. | 214/6 B |
| 3,596,777 | 8/1971 | Neely | 214/6 B |
| 3,807,579 | 4/1974 | Havens | 214/6 B |

FOREIGN PATENTS OR APPLICATIONS

| 251,041 | 9/1962 | Australia | 214/6 B |
|---|---|---|---|

Primary Examiner—Robert J. Spar
Assistant Examiner—Leslie J. Paperner
Attorney, Agent, or Firm—Sheridan, Ross & Fields

[57] ABSTRACT

Bale loader, for use with a truck having a horizontal bed adapted to be tilted to vertical position for depositing its bale load on the ground, characterized by means for attaching the loader to the truck to be bodily carried thereby during use, means for picking up spaced bales lying on the ground as the truck moves along a field and conveying same to a bale assembly station disposed adjacent the rear end of the bed wherein a bale wall is assembled, and means for sequentially pushing the bale walls toward the front end of the bed until the entire length of the bed is filled with bale walls, after which the loader may be detached from the truck, whereby the truck may proceed to an unloading locus without being encumbered by the loader. Since all loading operation are preferably under automatic powered control, the entire loading operation is effected by only a truck driver by guiding the truck along a desired course in the field.

1 Claim, 10 Drawing Figures

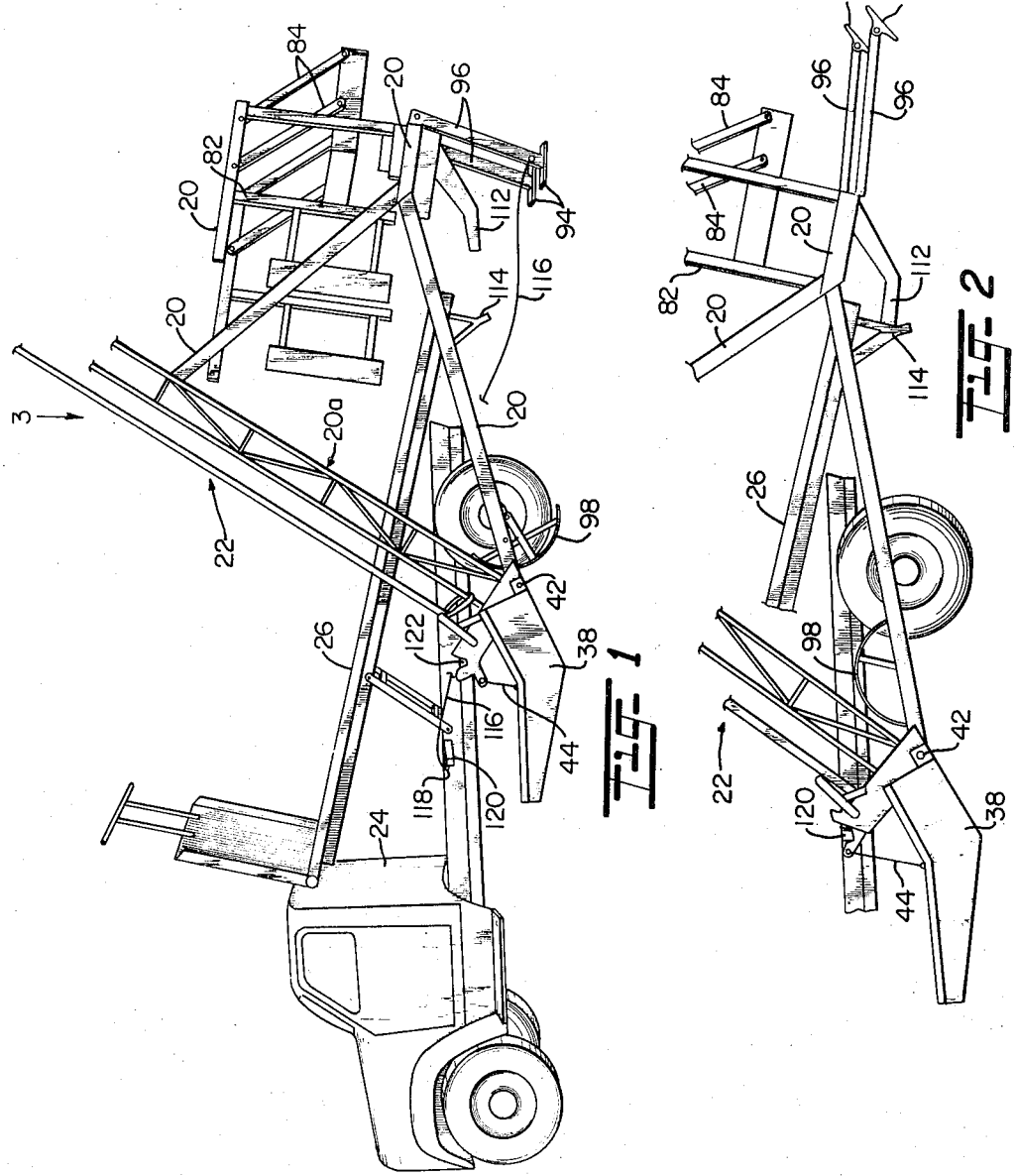

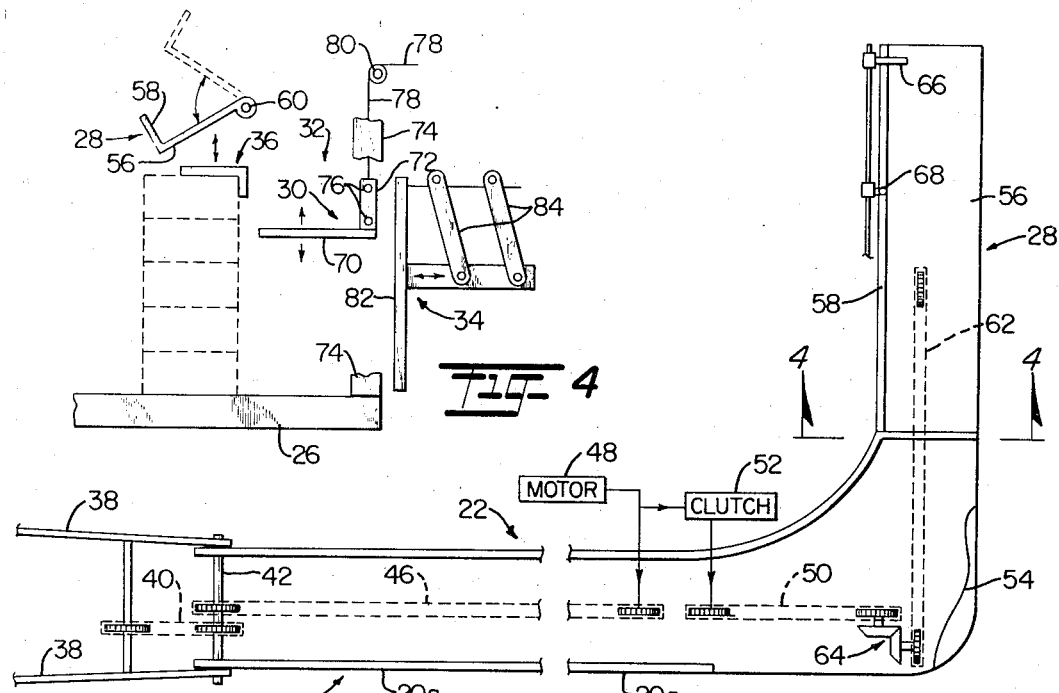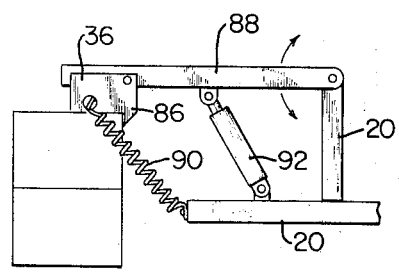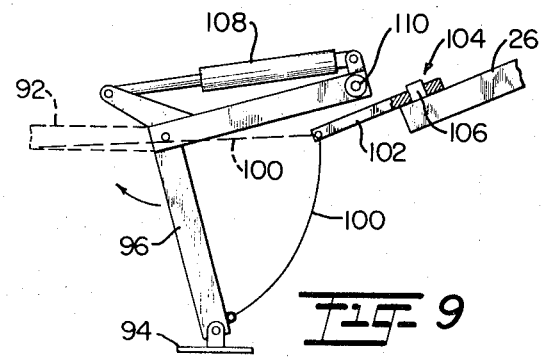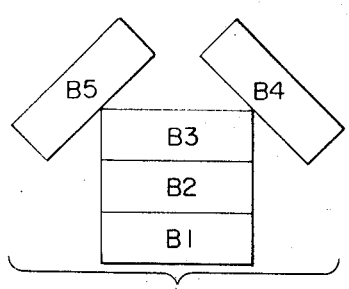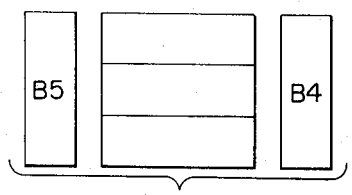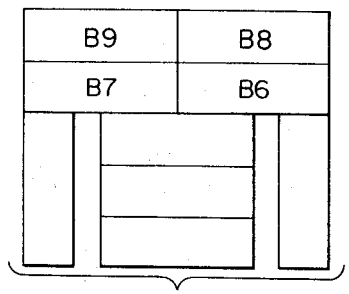

P - PUMP OUTPUT
S - SUMP
92, 69 - SINGLE ACTING RAMS
65, 53, 85 - DOUBLE ACTING RAMS

BALE LOADER

This is a division, of application Ser. No. 233,430, filed Mar. 9, 1972, now U.S. Pat. No. 3,809,256.

BACKGROUND OF THE INVENTION

In the haying art it is conventional practice to bale hay with a baler which moves along a harvested field and deposits the bales on the field at various loci. They are then loaded onto a truck, wagon or tractor drawn trailer for transportation to their storage locus or destination. It is also known practice to provide the transportation vehicle with a normally horizontal bed pivoted to the vehicle adjacent its rear end which may be tilted to a substantially vertical position to permit the bale load to be bodily removed therefrom, such as by a hydraulically operated pushing device carried by the vehicle, which pushes the vehicle away from the bale load, thus depositing the bale stack at the desired storage locus. In a refinement of the general procedure just referred to, it is also conventional practice to load the bales onto a truck which may carry its bale load to the unloading locus at highway speeds, this being particularly advantageous when the unloading locus is a considerable distance from the bales in the field as compared to transporting same with a horse drawn wagon, a tractor drawn trailer, or other slow moving vehicle which is not adapted for high speed transportation over highways. A tiltable bed of the type referred to is exemplified by the "Stackmaster" manufactured by Miskin Scraper Works, Inc. of Ucon, Idaho, which may be attached to conventional trucks, manufactured by others. Since such truck and its bed is not encumbered with any bale loading apparatus carried thereby it may be employed for transportation or dumping of other farm loads by suitable selection of bed stakes, bed side boards, etc.

A field bale loader is optionally supplied for such a truck when bale hauling is part of the overall hauling functions of the truck, also manufactured by the Miskin firm referred to. This comprises, briefly a wheel supported device, removably affixed to the truck adjacent one side thereof which is moved along the field with the truck and having an elevator which picks up the bales and elevates same to a receiving platform at one side of the truck bed which may be adjusted to variable elevations above the truck bed. The bales are then manually removed from the platform and stacked on the bed in desired patterns, preferably interlocking patterns. When the bed is loaded, the loader is detached and the truck proceeds to its destination. If such destination is a considerable distance from the hay field it will be apparent that the loader may be attached to other trucks for loading same during the interim for return of the first truck, thus reducing idle or down time of the loader as compared, for example, with a loader which forms a part of a single purpose vehicle and must be transported therewith, to and from the unloading locus.

SUMMARY OF THE INVENTION

The present invention is characterized by the Miskin combination of a tiltable bed truck and a detachable bale loader for same as previously described but differs in various respects. For example: the manual transfer and handling of the bales from the table is eliminated and the entire loading of the bales is attained by only the truck driver by driving the truck along the field in a desired course to pick up the bales lying thereon, the movement of the bales to their positions of repose on the bed thereafter being automatic; the bales are delivered to an assembly station just ahead of the rear end of the bed wherein a stacked wall of bales is formed after which the wall is pushed forwardly on the bed at least one bale wall thickness to thus re-establish another empty assembly station; this continues until the length of the truck bed is loaded with bale walls. Preferably, the bed is disposed in inclined position with the walls leaning rearwardly which renders same more stable against falling forwardly, as compared to vertically extending walls; since they are unstable against falling rearwardly, however, and may tend to slide rearwardly in some instances, the rearmost wall is clamped to the bed except when a new wall (and walls previously formed) are pushed forwardly during which time a wall pusher stabilizes the load from falling or sliding rearwardly; a tiltable bale support table is provided adjacent the upper end of the bale assembly station to which one or a plurality of bales may be optionally delivered for dumping into the upper end of the assembly station for forming walls of different bale arrangements disposed on an incrementally lowering platform, such as a tie wall; depositing certain of the bales on their ends by unbalanced gravity force utilizing other bales as fulcrums; and, providing the loader with a hydraulically operated swingable leg and cable system for attaching and detaching the loader to and from the truck.

The foregoing features comprise the principal objects of the invention. Further objects, advantages and salient features will become more apparent from the detailed description to follow, the appended claims and the accompanying drawings, to now be briefly described.

BRIEF DESCRIPTION OF DRAWING

FIG. 1 is a side elevation of the subject of the invention, certain details being omitted, illustrating the bale loader resting on a field and about to be attached to a truck;

FIG. 2 is a like partial elevation illustrating the bale loader attached to the truck;

FIG. 3 is a diagrammatic top elevation, portions being omitted, as viewed in the direction of arrow 3, FIG. 1;

FIG. 4 is a diagrammatic side elevation as viewed from line 4—4, FIG. 3, the truck bed being illustrated in horizontal position to simplify the drawing, rather than in the normal inclined loading position of FIG. 1;

FIG. 5 is a detail of a bale wall clamp;

FIGS. 6, 7 and 8 illustrate the steps in assembling a tie wall;

FIG. 9 is a side elevation of the loader leg illustrating the manner of attaching the loader to a truck.

DETAILED DESCRIPTION OF PREFERRED EMBODIMENT

General

Figure 10:
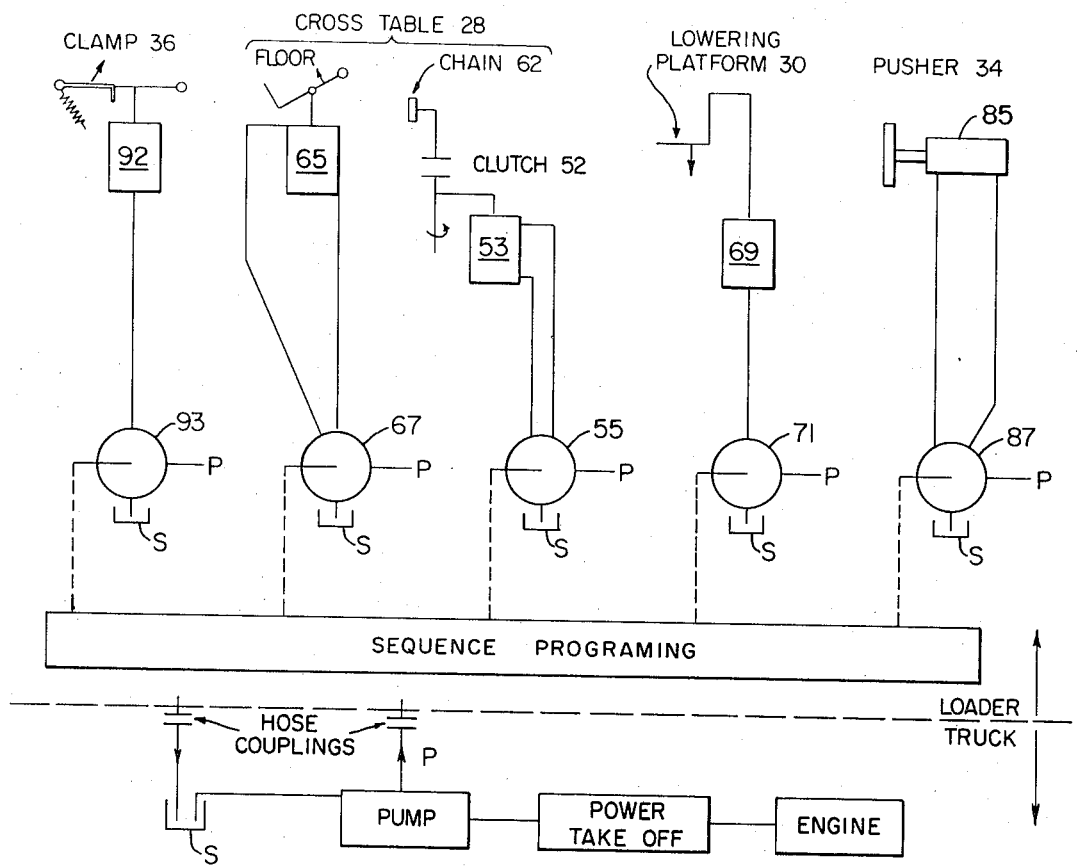
FIG. 10 diagrammatically illustrates a control system.

Referring now to the drawing, and first to FIGS. 1–4 and 10, the subject of the invention comprises: a rigid frame 20 to which is affixed an elevator 22 disposed adjacent one side of a truck 24 having a tiltable bed 26; a tiltable cross table 28 to which bales are delivered from the side elevator; a lowering platform 30 forming a floor for a bale wall assembly station 32; a bale wall pusher 34; and a movable bale wall hold down member or clamp 36. As will be understood, the bed 26, as illustrated in FIG. 4, will normally be disposed in the inclined position of FIG. 1 during loading of bales thereon. Suitable means are also provided, to be subsequently described in detail, for attaching the bale loader to the truck and for detaching same therefrom after the truck has been fully loaded.

Side Elevator

Side elevator 22 comprises a frame 20a forming a rigid part of the loader frame, the lower end of which is provided with rearwardly convergent side plates 38, for guiding a bale onto a conveyor chain 40. The plates and chain are supported on a horizontal pivot 42 to permit same to float upwardly when ground irregularities are encountered and is limited against downward movement by adjustable chains 44. Conveyor chain 40 transfers a bale to conveyor chain 46 driven by a hydraulic motor 48, which carries it part way up the side conveyor. A continuing conveyor chain 50, connected to conveyor chain 46 by a disconnectable dog clutch 52, operated by a ram 53 (FIG. 10) and under control of valve 55, conveys the bale the rest of the way to the top of the side conveyor at which point it contacts a turning shield 54 which turns the bale 90° for transfer to cross table 28. Suitable spaced tines (not shown) are provided on all chains which disengage from the bale during transfer of a bale from one chain to another.

Cross Table

Cross table 28 comprises a flat floor 56 and upstanding plate 58 which prevents a bale disposed thereon from sliding forwardly when the floor is disposed in forwardly and downwardly inclined position. The table is pivoted about a horizontal axis 60 so that it may be moved to a rearwardly and downwardly inclined position at which bales thereon slide off of same and fall into the upper end of the assembly station 32.

A cross conveyor chain 62, driven by conveyor chain 50 through a gear transmission 64, is provided with an upper run disposed adjacent the floor of the table, with its tines projecting above the table, this chain being movable around sprockets journaled about axes fixed with respect to the loader frame. As will be apparent, when the table tilts, a bale disposed thereon is first lifted away from the tines, after which it is free to slide on the table and fall into the upper end of the assembly station.

As best shown in FIG. 3 conveyor chain 62 terminates somewhat short of the center line of the truck bed so that a bale may be delivered to the distal side of the table where it may rest free of the tines. This permits a second bale to be moved to a position relative to the chain where the second bale is disposed in a symmetrical position at the proximate side of the bed centerline. When in such position, motion of chain 62 is discontinued after which the table is tilted to dump both bales into the upper end of the assembly station.

Tilting of the table is effected by a double acting ram 65 (FIG. 10) the valve 67 for which is under control of bale position abutments 66 and 68. Abutment 66 may remain in a desired fixed position and abutment 68 may be selectively moved into or out of the path of a bale. When abutment 66, only, is employed a first bale will be conveyed beyond the inner end of chain 62 and rest on the table. The next bale being conveyed by chain 62 moves until it abuts the first bale and slight further movement causes the first bale to engage abutment 66 and declutch clutch 52, arresting motion of chains 50, 62. In response to the arresting of motion of chain 62, the table actuating ram 65 is commanded to tilt and deposit both bales into the upper end of the assembly station. When abutment 68 is moved to a position where it is in the path of a bale, the operation of the clutch and tilt of the table is the same except that only one bale will be deposited into the assembly station, this being deposited centrally into same.

Lowering Platform

The lowering platform 30 comprises a floor 70 secured to floor supports 72 disposed at opposite ends of the floor and guided for rectilinear movement along upstanding posts 74, such as channel sections, rollers 76 preferably being carried by the floor supports to minimize friction which would otherwise be considerable since the floor is cantilevered from the guide posts. The platform may be lowered and raised in any desired manner. As illustrated, it may be lowered by its own weight and load thereon and thus requires power only for raising same from its lowermost position to its uppermost position. To attain this, the lower end of a cable 78 is affixed to each floor support which is trained around an idler pulley 80 disposed at the upper end of each post. The two cables are thence trained over suitable other idler pulleys to a winch mechanism (not shown) the motion of which is controlled by a hydraulic cylinder 69 (FIG. 10) and a control valve 71 for same which allows predetermined incremental movement of the ram to thereby cause the winch to allow the table lowering elevator to lower in increments equal to the thickness of a bale. When the floor of the platform reaches the truck bed after the bale wall has been assembled, it is pushed off of the elevator by the pusher, to now be described, and the elevator is returned to its uppermost position to thus receive bales which will form the succeeding bale wall.

Bale Wall Pusher

The bale wall pusher comprises a plurality of transversely spaced plates 82 rigidly connected together and disposed in a common plane for engaging the rear plane of the bale wall. A plurality of plates are employed, rather than a single plate, since the rear vertical truck bed stakes are left in place and the plates of the pusher must move therebetween. As illustrated, the pusher is connected to the baler frame by pairs of links 84, the upper ends of which are pivotally connected to the baler frame and the lower ends of which are pivotally connected to the pusher, thus forming a parallelogram linkage which constrains the pusher plates to remain parallel in all positions thereof. In an operative embodiment, three sets of links are provided, one set being at the center of the pusher and the other two sets at opposite sides of the center set, thus providing a linkage system which supports the pusher plates for movement as described. A double acting hydraulic ram 85 (FIG. 10) is connected between the pusher and loader frame, preferably at a locus centrally of the pusher, for moving the pusher between its rearward and forward limits of movement and under control of valve 87.

Hold Down Clamp

Clamp 36, as illustrated in FIG. 5, is formed as a plate having a lip 86 at its rear edge for engaging the upper rear edge of the bale wall. Links 88 disposed at opposite lateral ends of the plate and pivotally connected thereto and to frame 20 support the plate for swinging movement to and from the bale wall. A spring 90 at each end urges the plate downwardly and hydraulic rams 92, disposed at each end, raise the plate away from the top of the bale wall to free same for forward slidable movement on the truck bed, the ram being under control of a valve 93.

Summary of Sequence of Operation

It will be assumed that: the truck is in constant motion across a field, conveyor chains 40, 46, 50, 62 are in constant motion; bales are being periodically picked up by the side conveyor and delivered to the cross table; and conventional bale walls are formed of two adjacent stacks of vertically aligned bales. The sequence is as follows:

1. Pick up first bale and convey to distal side of cross table.
2. Pick up second bale and convey to proximate side of cross table.
3. Discontinue operation of cross conveyor (declutch 52).
4. Tilt cross table (dump bales), return to original position and resume operation of cross conveyor.
5. Lower lowering platform one bale thickness during return of cross table.
6. Repeat operations until bale wall is completed and lower platform to truck bed.
7. Operate pusher to forward position, moving bale wall off of lowering platform.
8. Move bale wall clamp to clamping position.
9. Return pusher to rearward position and raise lowering platform to uppermost position.
10. Repeat operations until desired number of untied walls are disposed on truck bed, retaining bale wall clamp in clamped position except when a wall thereunder is being pushed forwardly.

Tie Wall (FIGS 6, 7 and 8)

When it is desired to form a tie wall between conventional walls, as just described, the operation is modified as follows:

1. Move bale abutment 68 into path of bale on cross table which stops a bale at a position centrally thereof.
2. Tilt table and deposit on lowering platform until bales $B_1$, $B_2$ and $B_3$ (FIG. 6) rest thereon.
4. Move bale abutment 68 out of path of bale to resume conventional stacking.
5. Deposit bales B4 and B5 which will rotate 90° and fall to the position of FIG. 7.
6. Resume operation of lowering platform.
7. Deposit bales B6, B7, B8 and B9 as in conventional stacking. (FIG. 8).

If desired, the sequence just described may be performed in reverse order in which event the tie wall would appear as viewed from a position 180° from that of FIG. 8.

Loader to Truck Connections (FIGS. 1, 2 and 9)

When not in use, the loader is supported on a field by a three point support system. The support for the major portion of the weight of the loader comprises a pair of laterally spaced feet 94 disposed at the lower end of a leg 96, pivoted at its upper end to the rear end of the loader for swinging movement about a horizontal axis. The third support comprises a segmental wheel 98 carried by the side elevator, the arcuate portion of which may roll along the field. A pair of slack cables 100, one at each side of the loader are provided, each having one end connected to the leg and the other end connected to a plate 102 having an aperture 104 adapted to engage an upstanding pin 106 on the rear end of the truck bed. A double acting hydraulic ram 108 is connected between the loader frame and leg for swinging the latter in opposite directions. In the operation of the mechanism, the truck is backed into appropriate position adjacent the loader as shown in FIG. 1 and the two plates 102 are secured to pins 106. With the brakes set on the truck, the leg is swung rearwardly by the ram, taking up slack in the two cables. As the loader lowers and moves toward the truck a roller 110 at each side of the loader contacts a plate and the roller rolls along same transferring a part of the loader to the truck. As the cables approach alignment with the leg, a pair of laterally spaced abutments on the loader engage the rear end of the truck bed and another abutment 112 disposed centrally between and beneath the other two abutments engages another abutment 114 on the truck thereby providing a three point abutment system between the loader and the truck. When the cables are finally tensioned they toggle across the line of pull. The weight of the rear end of the loader has now been transferred to the truck through the two rollers and the tension in the cables has now drawn the three abutments referred to in tight engagement, thus preventing relative movement between the truck and loader.

A third slack cable 116 is also secured to the leg which is trained over idler pulleys (not shown) carried by the side elevator, its forward end being provided with a hook 118 detachably engageable with a laterally extensible cantilevered bar 120 secured to the truck frame. During the tightening of the first two cables and movement of the loader toward the truck the side elevator moves forwardly as segmental wheel 98 rolls along the field. During final tensioning of the third cable the front end of the side elevator is lifted, transferring weight on the segmental wheel to bar 120. When tensioning of the third cable is completed notched abutments 122 on the side elevator abut and lock to bar 120, thus forming another rigid connection between the truck and loader. Segmental wheel 98 may now be swung to a position where it will clear irregularities in the field.

As will be apparent, when the leg is swung downwardly to its original position it and the segmental wheel may again support the loader on the field and permit the cables to be disconnected from the truck.

Controls and Summary (FIG. 10)

In an operative embodiment of the invention, a pump carried by the truck, driven by a power take-off from the truck engine, which pump is normally employed to tilt the truck bed and operate a bale load pusher when the bed is tilted to vertical position, is employed as the source of power for operating the various instrumentalities carried by the loader. Motion of the various parts is thus effected by hydraulic motors carried by the loader which are controlled by valves. In the most simple form of the invention these valves could be disposed in the truck cab and sequentially operated by the truck driver, observing the loading operation through a mirror system. This would be cumbersome, however, since it would detract from the attention which should be concentrated on steering the truck. This could be obviated by disposing the valves on the loader and providing an operator for same. One of the concepts of the invention, however, is to eliminate all manual intervention in the loading operation, other than guiding the truck across a field. The sequence of operation of the instrumentalities is thus preferably automatic.

In the operative embodiment of the invention referred to, motion of the various parts is sensed and the signals are conveyed to valves which, in turn, command hydraulic motors to operate in proper sequence. Links, cams, index mechanisms, etc., all mechanically operated by motion of the parts, are employed in the sensing. Since these mechanisms are quite complicated, illustration thereof has been omitted in the interests of simplifying the drawing. Moreover, they could take various forms, depending upon the designer provided the end results were known. As an example, it is common practice to sense the position of moveable parts with photoelectric cells and amplify the signals to operate actuators, such as solenoids, etc. Thus, it is believed within the purview of those skilled in the art to devise control systems, other than that employed in the operative embodiment, which would perform the same sequence functions so long as the desired sequence is known. The specific control system employed is thus believed to be no part of the invention, per se, and thus not germane to the overall combinations as set forth in the appended claims other than its broad office of providing sequence programming means for the various moveable instrumentalities.

What is claimed is:

1. A method for loading spaced bales of hay lying on a field onto the bed of a truck in abutting stacked configuration within a generally rectangular parallelepiped reference space above the bed as the truck continuously moves along the field, comprising the steps of:

a. attaching a bale loader which rests on the field when not in use to the truck at the field loading locus;
   b. sequentially picking up the bales with the loader and conveying same to an assembly station above the rear end of the bed while in a forwardly and upwardly inclined position and depositing same thereat in layers normal to the bed until a bale wall of desired height is formed;
   c. pushing the wall toward the front end of the bed a distance at least the thickness of the wall to thereby provide a space behind same in which a next wall may be formed;
   d. continuing the formation and pushing of the walls until a desired bed load is formed on the bed;
   e. clamping the rearmost wall against the bed to prevent it from falling or sliding rearwardly;
   f. lowering the bed to horizontal position after it has been filled with a bale load;
   g. transporting same to an unloading locus while in horizontal position, and
   h. elevating the bed toward a vertical position at the unloading locus for unloading.

* * * * *